United States Patent Office 3,041,183
Patented June 26, 1962

3,041,183
STABILIZED WRAPPED FOODSTUFF
COMPOSITIONS
Gerald R. Ferrante, Metuchen, N.J., and Rupert C. Morris, Berkeley, Calif., assignors to Shell Oil Company, New York, N.Y., a corporation of Delaware
No Drawing. Filed July 8, 1960, Ser. No. 41,502
3 Claims. (Cl. 99—171)

This invention relates to novel stabilized food compositions. In particular, it relates to food compositions stabilized with a particular class of bisphenols.

A wide variety of chemical antioxidants are known and are employed for the stabilization of such substrates as petroleum products, including gasoline and lubricants, natural and synthetic rubber, synthetic organic resins, and the like. Such antioxidants include phenols, amines, diamines, and sulfur containing compounds such as sulfides and disulfides. In many cases, however, these compounds, while excellent antioxidants, are too toxic for use in foods.

To be useful as a food antioxidant, three principal requirements must be met by a candidate compound. First, it must have stabilizing properties in the particular food substrate. Second, it must be non-toxic. Finally, it must be non-coloring so that it does not impart undesirable off-color to the food composition containing it. These requirements are not easily met, and only a relatively small number of chemical stabilizers have been approved by the Food and Drug Administration for use as a food additive.

It has now been found that a relatively new class of compounds can be safely incorporated into food. As a consequence, it is an object of the present invention to provide novel stabilized food compositions characterized by excellent stability, lack of off-taste, off-color or off-odor. Stabilized food compositions having no increased toxicity are another object as are food compositions stabilized in packaging materials containing the novel stabilizer. Other objects will be apparent from the following description of the invention.

These objects are accomplished in the invention by the stabilized food composition which comprises a foodstuff normally subject to oxidative deterioration in intimate contact with a stabilizing amount of bis(3,5-dialkyl-4-hydroxyphenyl)methane, wherein each alkyl group is branched on the alpha carbon atom. Such foodstuffs include cooked and uncooked solid foods, such as meats, vegetables, fruits and the like, and liquids, such as juices, oils, soups, beverages and sauces.

The particular chemical compounds which are employed in intimate contact with such foods are those bis(3,5-dialkyl-4-hydroxyphenyl)methanes wherein each of the alkyl groups is branched on the alpha carbon atom. Preferably, these compounds are those wherein each of the alkyl substituents on the phenyl ring is selected from the secondary and tertiary alkyl radicals having from three to eight carbon atoms. Exemplary of such compounds having secondary alkyl substituents are bis(3,5-diisopropyl - 4 - hydroxyphenyl)methane; bis(3,5 - di-sec-butyl - 4 - hydroxyphenyl)methane; bis(3-sec-butyl-5-sec-amyl-4-hydroxyphenyl)methane; bis(3,5 - di-sec-heptyl-4-hydroxyphenyl)methane; bis(3,5-di-sec-octyl-4-hydroxyphenyl)methane; and bis(3,5 - dicyclohexyl - 4 - hydroxyphenyl)methane.

Typical of compounds having tertiary alkyl substituents of from four to eight carbon atoms on the phenyl ring are bis(3,5-di-tert-butyl - 4 - hydroxyphenyl)methane; bis-(3,5-di-tert-amyl-4-hydroxyphenyl)methane; bis(3 - tert-butyl-5-tert-amyl-4-hydroxyphenyl)methane; bis(3,5 - di-tert-hexyl-4-hydroxyphenyl)methane; and bis(3,5-di-tert-octyl-4-hydroxyphenyl)methane.

Also representative of such bisphenols are those bisphenols substituted with both secondary and tertiary alkyl radicals, such as bis(3-tert-butyl-5-isopropyl-4-hydroxyphenyl)methane and (3,5-di-tert-butyl-4-hydroxyphenyl)(3',5'-diisopropyl-4'-hydroxyphenyl)methane.

In general these compounds may be represented by the structure

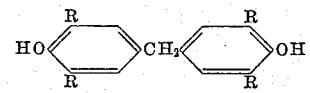

wherein each R is an alkyl radical, having from 3 to preferably 8 carbon atoms, wherein the alpha carbon is branched. Of these compounds, the 3,3',5,5'-tetra-tertiary alkyl bisphenols have the best antioxidant properties and are therefore the preferred stabilizers. Of these, the most preferred embodiment, which combines the most desirable properties of low toxicity and superior antioxidant capability, is bis(3,5-di-tert-butyl-4-hydroxyphenyl)methane.

The foods with which such compounds are in intimate contact are those foodstuffs normally subject to oxidative deterioration. In general, such foodstuffs comprise, in whole or in part, edible oils or edible fats which on exposure to oxygen, light, heat or various combinations thereof become rancid and display undesirable color, taste or odor. Rancidity is the chemical reaction between the oxygen of the air and dry unsaturated bonds in the food and is catalyzed by moisture, heat and light. In the reaction, peroxides are probably formed, and are then broken down to aldehydes. Microorganisms and enzymes present in the food also accelerate the oxidation of such unsaturated fatty materials.

Edible oils which are stabilized with the tetraalkyl bisphenols to yield the oxidation-resistant compositions of the invention include linseed oil, menhaden oil, cod liver oil, safflower oil, castor oil, olive oil, rapeseed oil, coconut oil, sesame oil, peanut oil, babassu oil, palm oil, corn oil, and the like. Edible fats which are stabilized in the same manner are represented by oleomargarine, lard, beef tallow, animal fat and hydrogenated vegetable shortening products as are sold under such trade names as "Spry," "Crisco," "Snowdrift," and the like. Other oils and fats which have been specially treated by air blowing, heating, and the like may also be stabilized with the bisphenols described.

One particularly useful class of the stabilized compositions of the invention is that comprising a dairy product normally subject to oxidative deterioration in intimate contact with a stabilizing amount of the bis(3,5-dialkyl-4-hydroxyphenyl)methane described. By dairy product is meant such items as whole milk, cream, butter, milk powder and cheese, all of which contain butter fat susceptible to rancidity. Meats, particularly fatty meats, such as bacon, sausage, ham and hamburger; and poultry, including turkey, squab and duck, may also be stabilized against rancidity by treatment with these tetraalkyl bisphenols. Bakery products, including bread, cookies, pretzels, pastries, pies and cakes, and candies, particularly those made of chocolate, cream filling, butter, and nuts, which tend to become rancid on storage, are also afforded considerably extended shelf life by incorporation therein of the bisphenols. For example, a package of walnut meats which contains a few crystals of bis(3,5-di-tert-butyl-4-hydroxyphenyl)methane has a shelf life many times that of a similar package not so protected.

When oils or fats containing the tetraalkyl bisphenols are employed for cooking, frying or baking, it will be observed that sufficient of the oil or fat is incorporated in the cooked product so as to render the food stable and retard development of rancidity therein. Thus, potato chips fried in an oil consisting of 50% vegetable shortening and 50% vegetable oil, containing 1% w., based on the total oil, of bis(3,5-diisopropyl-4-hydroxyphenyl)-methane, have greater stability than potato chips fried in oil not containing the bisphenol.

The method by which the tetraalkyl bisphenols of the invention are brought into intimate contact with the foodstuff described will, of course, depend on the nature of the foodstuff. In many cases, the bisphenol may be physically incorporated into the foodstuff. When the substrate is a liquid, such as an oil, milk, cream or fruit juice, such as citrus fruit juice, the bisphenol may be dissolved in the liquid. In solid foods, the bisphenol may be incorporated by dissolving it in one of the ingredients, such as the shortening in pie crusts, or by dispersing it on the surface in solid, liquid or emulsion form. In some cases, the bisphenol may be incorporated in the packaging which is employed in direct contact with the surface of the food; under these circumstances the antioxidant serves to prevent oxidation at the surface of the packaged item.

It is well known that traces of chemicals present in paper products actually catalyze the oxidation of fatty organic materials in contact with the paper. By incorporating a stabilizing amount of the tetraalkyl bisphenol in the paper, the oxidation catalysis is suppressed and the surface of the food is also preserved against normal oxidation resulting from prolonged exposure to air. The bisphenol may be combined with the paper by conventional papermaking methods as, for example, by applying it to paper leaving the Fourdrinier machine as a solution or oil-in-water emulsion. It may also be employed in such other cellulosic wrapping materials as paperboard, cellophane, tissue paper, vegetable parchment paper, and the like. Papers treated in this manner are found to be especially effective to stabilize packaged foods such as butter, bacon, fish, candy, nuts and oleomargarine.

For example, in the manufacture of chocolate board, the tetraalkyl bisphenol may be incorporated in the dye solution which is then used to treat the paperboard. On the other hand, in waxed papers, the bisphenol is most conveniently added to the paraffin wax when the wax is at its lowest viscosity, around 140°–160° F., and stirred in until complete dispersion is achieved. The paper is then impregnated with the wax-bisphenol dispersion in the conventional manner.

Meats and seafoods, such as fish, crab, lobster, shrimp and the like, may also be preserved by spraying a dispersion of the tetraalkyl bisphenol onto their surface prior to storage or transporation of the foods. Compositions so treated are resistant to development of rancidity and discoloration for prolonged periods of time.

One important feature of the compositions of the invention is that the bisphenol therein serves to prevent the degradation of vitamins, including those naturally contained in oils and fats, those prepared synthetically, and those recovered from other sources such as ascorbic acid and vitamin A. The bisphenols may be readily dispersed in vegetable or fruit juices for this purpose. Compositions of particular utility are citrus fruit juices such as lemon juice, orange juice and grapefruit juice, and other juices including pineapple juice, tomato juice, apple juice, and grape juice, containing a stabilizing amount of the bis(3,5-dialkyl - 4 - hydroxyphenyl)methanes described above. Animal feeds, such as alfalfa, silage, chicken feed, dog and cat food, and fish meal may also be stabilized against the development of rancidity, off-taste and degradation of vitamins through oxidation by incorporation therein of a stabilizing amount of the bis-(3,5-dialkyl-4-hydroxyphenyl)methanes of the invention. The amount of stabilizer required will in general be that corresponding to the amount needed for other foods. Thus, the nutritional values offered to poultry feeds by menhaden fish meals are reduced when the feed is stored at temperatures on the order of about 150° F. or above through denaturation of protein and oxidative degradation of vitamins, particularly those of the vitamin B complex. Inclusion in the fish meal of about 0.2% by weight of bis(3,5-di-tert-butyl-4-hydroxyphenyl)methane materially increases the useful storage life of poultry feeds based on such meal without impairing the taste or nutritional value of the feed in any way.

By stabilizing amount is meant the amount of the bis-(3,5-dialkyl-4-hydroxyphenyl)methane sufficient to stabilize the composition against oxidative deterioration. This amount will, of course, depend both on the particular bisphenol in the food composition and on the nature of the food substrate itself. In general the compositions of the invention will comprise essentially the foodstuff stabilized and only a relatively small amount of the tetraalkyl bisphenol. The amount of bisphenol required will thus range from about 0.0001% by weight of the substrate to about 1% thereof, and preferably from about 0.001% to about 0.1% on the same basis.

Another important advantage of the compositions of the invention is that they retain their stabilized properties under conditions of heat and moisture as, for example, during processing, when many other food compositions lose their stabilizer through volatilization thereof. This is particularly important when the stabilizer is incorporated in the paper wrapping during paper manufacture where the moist paper is subsequently dried. It has been found that at advanced temperatures and humidities the bis(3,5-dialkyl-4-hydroxyphenyl)methane remains in the food substrate and thus preserves it after compositions stabilized with other preservatives have begun to deteriorate.

In some cases the antioxidant composition may include additional components, such as acids including gallic acid, citric acid, ascorbic acid, tartaric acid and phosphoric acid. Esters of these acids, such as isopropyl citrate or propyl gallate, may also be included.

To illustrate further the novel compositions of the invention, the following specific examples are set forth. It should be understood, however, that these examples are merely illustrative and are not to be regarded as limitations to the appended claims since the basic teachings therein may be varied at will as will be understood by one skilled in the art. In the examples, the proportions are expressed in parts by weight unless otherwise noted.

EXAMPLE I

Two candidate antioxidants were tested for acute toxicity by feeding tests employing a non-fasted male rat. Both compounds were administered as a suspension in corn oil. Accurate $LD_{50}$ values were calculated by the method of moving averages, as outlined by Thompson and Weil (Biometrics 8, 51–4 (1952)) and by Weil (Biometrics 8, 249–63 (1952)). Resulting data are set forth in Table I below.

*Table I*

| Antioxidant | Dosage, mg./kg. | Mortality Ratio | $LD_{50}$ Range (g./kg.) |
| --- | --- | --- | --- |
| Bis(3,5-di-tert-butyl-4-hydroxyphenyl)-methane | 7,500<br>15,000 | 0/5<br>0/5 | >15 |
| 2,6-Di-tert-butyl-4-methyphenol | 1.25<br>1.57<br>1.79<br>2.50<br>3.15<br>3.79<br>5.00 | 0.5<br>1/5<br>1/5<br>1/5<br>3/5<br>5/5<br>5/5 | 2.6<br>(2.2–3.1) |

These data demonstrate that although both antioxidants are relatively non-toxic the bisphenol is less than a fifth as toxic as the phenol.

Preliminary experiments with mice indicate that the anti-oxidant bis(2-hydroxy-3-tert-butyl-5-methylphenyl)-methane has an $LD_{50}=6.7$ g./kg.

EXAMPLE II

To evaluate the effectiveness of several antioxidants in a typical edible fatty oil, induction period measurements were made using the gravimetric procedure of Olcott and Einsett, J. Am. Oil Chemists' Soc. 35, 161 (1958). Samples of various substrates containing different concentrations of the antioxidants were stored in an oven at 50° C. and weighed daily until a rapid increase in weight was obtained. The data showing the relative efficiencies of the candidate antioxidants are presented in the following tables. Data presented are days to rancidity.

In Table II, the effectiveness of various concentrations of several antioxidants in methyl linoleate are set forth.

Table II

| Additive | Concentration, percent w. | | |
|---|---|---|---|
|  | 0.01% | 0.02% | 0.04% |
| None | 4 | 4 | 4 |
| 2,2′,6,6′-Tetra-tert-butyl biphenol | 4¾ | 12 | 20½ |
| Bis(3,5-di-tert-butyl-4-hydroxyphenyl)methane | 11¼ | 14½ | 23½ |

In Table III is presented the relative performance of several antioxidants in several other food media. Where antioxidant performance in paperboard was evaluated, the antioxidant was added to the paperboard in methanolic solution and the paperboard was dried before testing. Antioxidant concentrations of 0.02% w., based on the oil, were employed except in the paperboard test, wherein the concentration was 0.2% w., based on the paperboard.

Table III

| Antioxidant | Fatty Product | | | Paperboard |
|---|---|---|---|---|
|  | Lard | Soybean Oil | Methyl Linoleate | Lard |
| None | 8½ | 20½ | 3¼ | 7 |
| 2,6-Di-tert-butyl-4-methylphenol | 98 | 23¼ | 5½ | 52½ |
| 2,2′,6,6′-Tetra-tert-butyl biphenol | 140 | 40½ | 4 | 34 |
| Bis(3,5-di-tert-butyl-4-hydroxyphenyl)methane | 110 | 68¼ | 8½ | 51 |

From these data, it will be seen that compositions containing bis(3,5-di-tert-butyl-4-hydroxyphenyl)methane were generally more stable than those containing the other antioxidants tested.

EXAMPLE III

Solutions of two antioxidants in a water-methanol mixture (40% water-60% methanol) were distilled. Each solution contained 0.02 g. of antioxidant. Colormetric determinations of the quantities of antioxidant present in the overhead and bottoms fraction were made after 75 ml. of water had been collected in the overhead fraction. The results of these experiments showing the relative amounts of the two fractions are given in Table IV.

Table IV

| Antioxidant | Percent w. Antioxidant | |
|---|---|---|
|  | Overhead | Bottoms |
| 2,6-Di-tert-butyl-4-methylphenol | 100 | 0 |
| Bis(3,5-di-tert-butyl-4-hydroxyphenyl)methane | 8 | 92 |

The data show that under the conditions of the test 2,6-di-tert-butyl-4-methylphenol was readily steam-distilled while the bis-phenol was relatively non-volatile.

EXAMPLE IV

When 0.25-pound blocks of butter are stored at room temperature in bleached sulfite pulp handsheets containing 0.25% w. bis(3,5-di-tert-butyl-4-hydroxyphenyl)methane, the odor of rancidity from the resulting package requires at least twice as long to become apparent as that from blocks stored under identical conditions in samples of the same paper containing no antioxidants.

EXAMPLE V

A slab of bacon is stabilized against rancidity by soaking it in a 10% vegetable oil solution of bis(3,5-di-tert-butyl-4-hydroxyphenyl)methane until a stabilizing amount of the inhibitor is incorporated in the bacon. Development of discoloration and odor of rancidity in the slab of bacon, when stored at room temperature, requires considerably more time than that in non-stabilized bacon.

EXAMPLE VI

Menhaden scrap is stabilized against rancidity by mixing with 0.2% w. bis(3,5-di-tert-butyl-4-hydroxyphenyl)methane.

EXAMPLE VII

Employing the method of Olcott and Einsett described in Example II, the stability of a one-gram sample of safflower oil containing 0.0002 g. of bis(3,5-di-tert-butyl-4-hydroxyphenyl)methane was determined. Results of this determination are presented in Table IV below.

Table IV

| Antioxidant: | Safflower oil, days to rancidity, at 50° C. |
|---|---|
| None | 5¾ |
| Bis(3,5-di-tert-butyl-4-hydroxyphenyl)methane | 7¼ |

We claim as our invention:
1. A stabilized food compositoin, comprising a foodstuff normally subject to oxidative deterioration, said foodstuff being in intimate contact with a cellulosic wrapping containing a chemical capable of catalyzing the oxidation of said foodstuff, said cellulosic wrapping also containing bis(3,5-dialkyl-4-hydroxyphenyl)methane, wherein each alkyl group is branched on the alpha carbon atom and has from 3 to 8 carbon atoms, in amount sufficient to inhibit the oxidation catalyzed by said chemical.
2. The composition of claim 1, wherein each alkyl group is tertiary alkyl.
3. The composition of claim 1, wherein each alkyl group is tertiary butyl.

References Cited in the file of this patent
UNITED STATES PATENTS

| 2,906,646 | Smith et al. | Sept. 29, 1959 |
| 2,944,086 | Coffield et al. | July 5, 1960 |
| 2,991,193 | Fessler et al. | July 4, 1961 |

OTHER REFERENCES

Food Investigation, Special Report No. 46, entitled, "Rancidity in Edible Fats," published by the Department of Scientific and Industrial Research (London), 1938, pp. 170 and 171.